US 6,487,615 B1

(12) United States Patent
Hunsaker

(10) Patent No.: US 6,487,615 B1
(45) Date of Patent: *Nov. 26, 2002

(54) APPARATUS AND METHOD FOR ACCEPTING PHYSICAL WRITE PACKAGE WHEN THE POSTED WRITE ERROR QUEUE IS FULL

(75) Inventor: Mikal C. Hunsaker, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/075,738

(22) Filed: Feb. 14, 2002

Related U.S. Application Data

(63) Continuation of application No. 09/105,500, filed on Jun. 26, 1998, now Pat. No. 6,366,968.

(51) Int. Cl.[7] .................... G06F 13/00; G06F 13/38; G06F 11/00; G06F 11/16; G06F 3/06
(52) U.S. Cl. .................. 710/52; 710/29; 710/38; 710/39; 710/53; 710/57; 710/112; 714/48
(58) Field of Search ................ 710/22, 29, 30, 710/38, 39, 52–57, 112; 714/48, 49, 54, 798, 799; 709/212, 236, 238

(56) References Cited

U.S. PATENT DOCUMENTS

| | | | |
|---|---|---|---|
| 4,888,691 A | | 12/1989 | George et al. |
| 5,065,354 A | | 11/1991 | Jons et al. |
| 5,408,644 A | | 4/1995 | Schneider et al. |
| 5,432,918 A | * | 7/1995 | Stamm ........................ 710/112 |
| 5,448,719 A | | 9/1995 | Schultz et al. |
| 5,479,636 A | * | 12/1995 | Vanka et al. ................. 711/133 |
| 5,561,783 A | * | 10/1996 | Vanka et al. ................... 710/57 |
| 5,588,110 A | * | 12/1996 | DeKoning et al. .............. 714/5 |
| 5,588,125 A | | 12/1996 | Bennett |
| 5,613,075 A | * | 3/1997 | Wade et al. .................. 710/107 |
| 5,615,334 A | | 3/1997 | Wang et al. |
| 5,768,548 A | * | 6/1998 | Young et al. ................. 710/129 |
| 5,894,587 A | * | 4/1999 | Normoyle et al. .......... 710/126 |
| 5,938,739 A | * | 8/1999 | Collins et al. .............. 710/107 |
| 6,026,460 A | * | 2/2000 | David et al. ................. 710/129 |
| 6,085,274 A | * | 7/2000 | Seeman ....................... 370/402 |
| 6,148,348 A | * | 11/2000 | Garnett et al. ................. 710/14 |
| 6,157,977 A | * | 12/2000 | Sherlock et al. ............. 370/402 |
| 6,209,067 B1 | * | 3/2001 | Collins et al. ............... 710/240 |
| 6,223,231 B1 | | 4/2001 | Mankude |
| 6,230,228 B1 | * | 5/2001 | Eskandari et al. ........... 710/129 |
| 6,243,781 B1 | * | 6/2001 | Gandhi et al. .............. 710/129 |
| 6,247,102 B1 | | 6/2001 | Chin et al. |
| 6,256,685 B1 | | 7/2001 | Lott |
| 6,298,396 B1 | * | 10/2001 | Loyer et al. ................... 710/22 |
| 6,351,427 B1 | * | 2/2002 | Brown ................... 365/189.05 |

* cited by examiner

Primary Examiner—Jeffrey Gaffin
Assistant Examiner—Tanh Q Nguyen
(74) Attorney, Agent, or Firm—Blakely, Sokoloff, Taylor & Zafman LLP

(57) ABSTRACT

A system for handling write requests is described. The system uses two queues for storing posted write requests. When a posted write error results, software handles the posted write error using information stored in a first queue of the two queues. The write request producing the posted write error is cleared from the second queue which continues to handle physical packets containing write requests.

20 Claims, 4 Drawing Sheets

| Physical Packet Type | Physical Response Queue | Posted Write Error Queue | Ack Code |
|---|---|---|---|
| Write Request | Not Full (count <2) | Not Full (count <2) | ACK_COMPLETE |
| Write Request | Not Full (count <2) | Full (count = 2) | ACK_PENDING |
| Write Request | Full (count = 2) | Does not care | ACK_BUSY |
| Read or Lock Request | Not Full (count <2) | Does not care | ACK_PENDING |
| Read or Lock Request | Full (count = 2) | Does not care | ACK_BUSY |

*Figure 2*

APPARATUS AND METHOD FOR ACCEPTING PHYSICAL WRITE PACKAGE WHEN THE POSTED WRITE ERROR QUEUE IS FULL

CROSS-REFERENCES TO RELATED APPLICATIONS

This is a continuation of U.S. patent application (application Ser. No. 09/105,500) filed Jun. 26, 1998, which has now matured to U.S. Pat. No. 6,366,968.

BACKGROUND OF THE INVENTION

1. Field of the Invention

The invention applies to the field of interface circuits connecting memory systems to a bus. The invention is particularly applicable to the field of handling pending memory request signals from a bus.

2. Background Information

A general purpose computer system typically includes a processor, memory, and one or more peripheral devices coupled together by one or more buses. These buses may use asynchronous transmission, isochronous transmission or a combination of the two. Asynchronous transmission places an emphasis on guaranteed delivery of the data. In asynchronous transmission, the recipient of the data, typically a processor acknowledges when asynchronous data has arrived and has been properly written to memory. Isochronous transmission places an emphasis on guaranteed timing of the data. Isochronous data typically has a guaranteed latency in that a packet of data is transferred at predetermined time intervals In isochronous transmission, when data is lost, the data is often not recoverable. Isochronous transmission is often used in real time communications such as video communication systems.

In order to speed up reading and writing to memory, asynchronous transmission includes a protocol defining a subcategory of data called "physical packets." Typically, a software layer determines how most data packets are handled. However, the software layer is slow. Physical packets bypass the software layer, allowing access to memory via hardware which is faster than the software.

In order to handle physical packets, the device transmitting the data and the device receiving the data must be compatible. Compatible devices usually include hardware and protocols that allow direct reads and writes to specific memory addresses without software intervention. The hardware also generates acknowledge signals to acknowledge receipt of the physical write packet.

Certain specifications, including the IEEE 1394-OHCI (Open Hosts Controller interface) specify two methods of handling a physical packet, containing a write request. In a first method, when a write request is received, the receiving device outputs an acknowledgment pending ("ACK_PENDING") packet or signal indicating that the write request has been received. When processing of the received write request is complete and the data is written to an appropriate section of memory, a response packet, such as an ACK_COMPLETE packet is transmitted.

The IEEE-1394-OHCI specification also defines a second method of handling write requests as a "posted write." When handling posted writes, the hardware of the receiving device transmits an ACK_COMPLETE packet upon receipt of a write request in a physical packet. The received write request is stored in a buffer in the hardware of the receiving device to be executed at a later time. If, at the later time, the data is properly written to memory, no further action needs to be taken because the ACK_COMPLETE packet which was transmitted indicated that the information was already properly written to memory. However, if the receiving device is unable to execute the write request, an error occurs. The software of the receiving device handles the error. The software may re-route the write request. Typically, software in the receiving device transmits an error packet to the originator of the write request indicating that the ACK_COMPLETE packet is invalid and that the data has not been properly written to memory. However, until software clears the error, the buffer maintains the information corresponding to the write request, preventing further receiving of write requests. Because software can be slow, an error in a posted write can significantly slow down operation of the system.

Thus, an improved method of handling physical packets containing write requests is needed.

SUMMARY OF THE INVENTION

A circuit for handling memory access request is described. The circuit includes a receive memory device to temporarily store physical packets, including memory access requests from a bus. The physical packets include write requests. A posted write error queue is coupled to the receive memory device. The posted write error queue stores physical write requests for processing when a physical write request that was handled as a posted write request fails. A physical response queue also coupled to the memory device continues to accept non-posted write packets when the posted write error queue is full.

BRIEF DESCRIPTION OF THE DRAWINGS

FIG. 2 is a table summarizing the acknowledgment codes output by the circuit of FIG. 1.

DETAILED DESCRIPTION OF THE INVENTION

In the following description, a system and method will be described for handling physical packets transmitted from a bus to a physical packet handling circuit. In the description, numerous specific details will be given including circuits, flow diagrams, etc., in order to provide a thorough understanding of the present invention. In other instances, well-known structures and techniques have not been shown in detail because to do so would unnecessarily obscure the present invention. The specific arrangements and methods described here are illustrative of the principles of the present invention. Numerous modifications in form and detail may be made by those of ordinary skill in the art without departing from the scope of the present invention.

Figure 1:
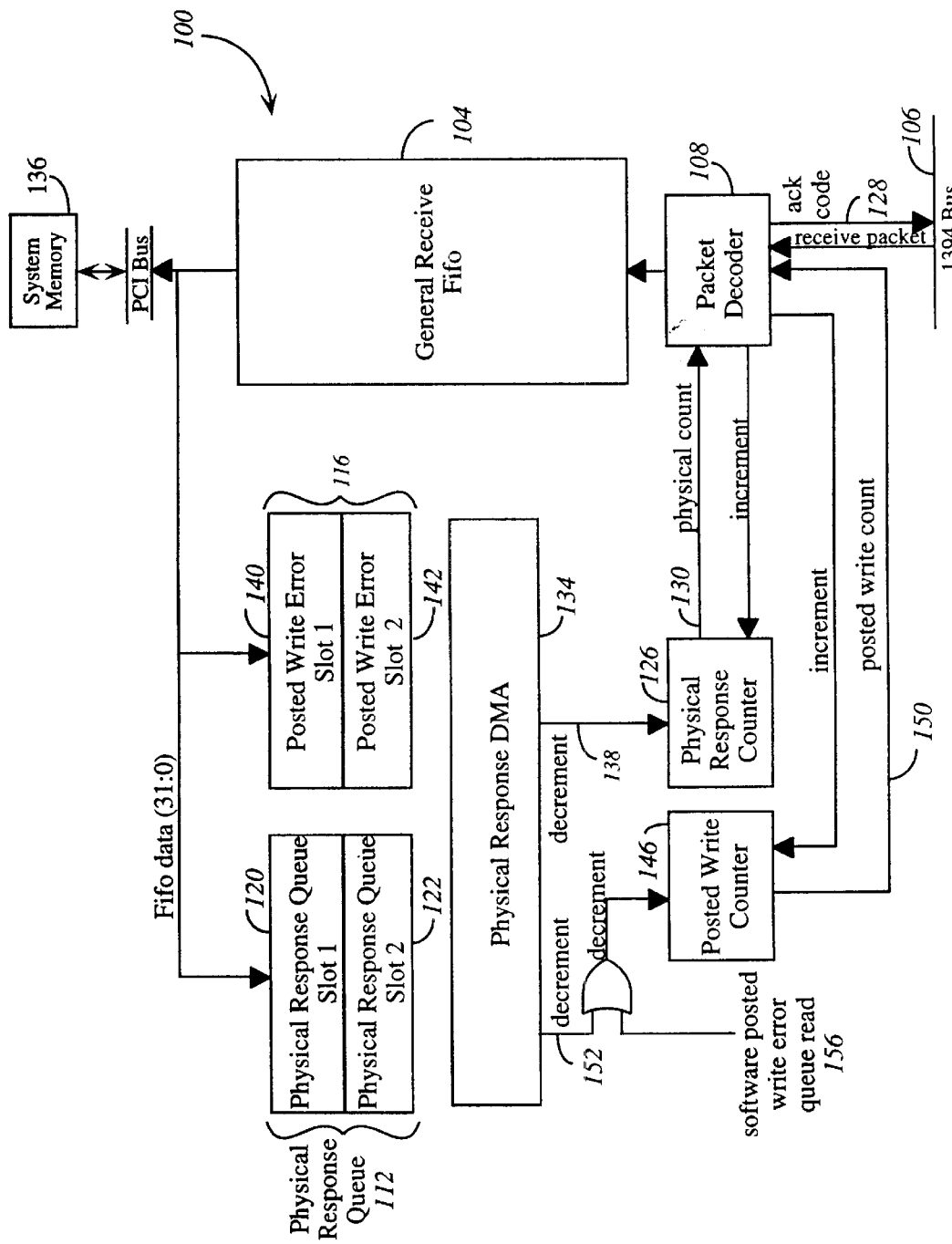
FIG. 1 illustrates one embodiment of a physical packet handling circuit.

One embodiment of a physical packet handling circuit 100 is shown in FIG. 1. The physical packet handling circuit includes memory devices, such as a receive First-In, First-Out memory (FIFO) 104 which receives physical packets from a 1394 bus 106. A packet decoder 108, including logic circuitry coupled to receive FIFO 104, determines whether the data received from bus 108 is a physical packet type. "Physical packet types" may include write requests, read requests, or lock requests. Write requests write data to a specific memory location, read requests read data from a specific memory location and lock requests perform a compare-swap to a specific memory location. If the data is a physical packet type, packet decoder 108 determines the state of a physical response queue 112 and a posted write error queue 116 to determine how to handle the physical packet type.

Both physical response queue 112 and posted write error queue 116 are buffers which store information until the information is ready to be used. For this illustrated embodiment, physical response queue 112 and posted write error queue 116 are FIFO memory devices, although other memory types may be used. Herein, physical response queue 112 includes a first physical response queue slot 120 and a second physical response queue slot 122. Each queue slot is configured to store either a physical packet or the header of a physical packet. Thus, as illustrated, the physical response queue 112 can receive a physical packet in the first physical response queue slot 120, while a prior physical packet is processed in a second physical response queue slot 122.

When packet decoder 108 determines that a read or lock request physical packet has been received and the physical response queue 112 is not full it places the packet in the receive FIFO. The count of physical response counter 126 indicates the number of requests stored in the physical response queue, thus, concurrent with the transfer of data from the receive FIFO 104 to the physical response queue 112, the packet decoder 108 transmits an increment signal 124 to a physical response counter 126. Packet decoder 108 also outputs an acknowledgment pending ("ACK_PENDING") packet on acknowledgment code line 128.

When packet decoder 108 determines that a received read or lock physical packet cannot be accepted because physical response queue 112 is full and unable to handle additional read or lock requests, packet decoder 108 transmits an acknowledgment busy ("ACK_BUSY") on code line 128. In the illustrated embodiment, packet decoder 108 determines whether physical response queue 112 is full by comparing the physical count signal from physical response counter 126 on line 130 to the maximum size of physical response queue 112. When the count in the physical count signal and the number of slots in the physical response queue are equal, physical response queue 112 is full. In the illustrated embodiment, the maximum number of physical packets that can be stored in the physical response queue is two.

When a physical request packet arrives at the top of the general receive FIFO, the packet header is placed in the physical response queue. When the physical request is a read or lock request, a physical response direct memory access (DMA) 134 executes the request. After the read or lock request is executed, the information stored in physical response queue 112 corresponding to the read or locked data is deleted from the physical response queue and the DMA transmits a decrement signal along decrement line 138 to decrement physical response counter 126.

When packet decoder 108 determines that a received physical packet is a write request, physical packet handling circuit 100 determines whether posted writes are enabled. When posted writes are not enabled, and physical response queue 112 is not full, the incoming write requests are stored in received FIFO 104 and the packet decoder 108 outputs an ACK_PENDING packet. When the write requests arrives at the top of the receive FIFO, the packet header is stored in the physical response queue. After DMA 134 executes the write request and writes the data to the system memory 136, the physical response DMA engine transmits a response packet. The DMA removes the data from write request queue 112 and decrements physical response counter 126.

Some specifications, including the IEEE 1394 OHCI specification allow write requests to be handled as posted writes. When posted writes are allowed, posted write error queue 116 is used in parallel with physical response queue 112. As receive FIFO 104 receives a write request, packet decoder 108 determines whether physical response queue 112 and posted write error queue 116 are full. Packet decoder 108 determines whether posted write error queue 116 is full by comparing a count from a posted write counter 146 with the storage capacity of the posted write error queue. In the embodiment illustrated in FIG. 1, posted write error queue 116 has a first posted write error queue slot 140 and a second posted write error queue slot 142, for a maximum capacity of two, although alternative embodiments may include only one error queue slot or three or more additional posted write error queue slots to handle larger numbers of posted write errors.

When the posted write error queue is not full, the write request is handled as a posted write and receive FIFO 104 forwards the write request to both physical response queue 112 and posted write error queue 116. Both queues store the packet header which includes data needed for responding to the posted write, which typically includes a source identification to identify the source of the write request, an address indicating where in memory, the data is to be stored.

When a write request is stored in receive FIFO 104, packet decoder 108 outputs an ACK_COMPLETE packet on code line 128. When the packet arrives at the top of the receive FIFO, the packet header is stored in the physical response queue and the posted write error queue. The write requests remain in physical response queue 112 and posted write error queue 116 until physical response DMA 134 writes the data successfully to system memory 136. When the data is successfully written to system memory 136, the write request is removed from physical response queue 112 and physical response DMA 134 transmits a decrement signal to physical response counter 126. The data is also removed from posted write error queue 116 and physical response DMA 134 decrements posted write counter 146 by transmitting a counter decrement signal along decrement line 152 through gate 154. No further acknowledgment codes regarding the write packet need to be transmitted because the ACK_COMPLETE signal has already been transmitted indicating successful writing to memory.

When physical response DMA 134 attempts to write to system memory 136 and the write is unsuccessful, a posted write error occurs. Posted write errors are undesirable and require that the ACK_COMPLETE signal already output from code line 128 be corrected. Such correction is handled by software. However, software handling of posted write errors takes significant amounts of time. In systems lacking an adequate physical response queue, handling of write requests may be suspended until the posted write error is corrected. However, in the illustrated embodiment, physical response DMA 134 clears the write request which produced the posted write errors from the physical response queue before software has completed handling of the posted write error. The cleared data allows new physical packets to flow into general receive FIFO and into physical response queue 112. Posted write error queue 116 retains the header data corresponding to the posted write error until software appropriately handles the error. After software has properly handled the write error, the corresponding write request may be removed from the posted write error queue and the software transmits a decrement counter signal along software posted write error queue read line 156 through gate 154, decrementing posted write counter 126.

As software handles errors in posted write error queue 116, physical response queue 112 continues to receive write requests as posted writes until posted write error queue 116 is full. In the illustrated embodiment, this occurs when there are two errors in posted write error queue 116. When the posted write error queue is full, the physical response queue may still receive write requests as a non-posted write requests. When the physical response queue receives a non-posted write request, packet decoder 108 transmits an ACK_PENDING packet along code line 128. After executing the non-posted write request, packet decoder 108 transmits a response complete packet. When software clears at least one slot in the posted write error queue, new write requests will be handled as posted writes.

FIG. 2 is a table that summarizes the acknowledgment codes output by packet decoder 108. The acknowledgment codes output 204 by the packet decoder 108 depends on physical packet type 208, the state of physical response queue 212, and the state of posted write error queue 216. When the physical packet type is a read or lock request and the physical response queue is not full, an ACK_PENDING packet is output, as illustrated in row 220. When the physical response queue is full, the read or lock request cannot be received and an ACK_BUSY packet is output, as illustrated in row 224.

Physical packets containing write requests may be handled as either posted writes or non-posted writes. When both the physical response queue and the posted write error queue are not full, incoming write requests may be treated as a posted write. In a posted write, an ACK_COMPLETE packet is output at the time at which the write request is received, as illustrated in row 228. When only the posted write error queue is full but the physical response has space, the write request will be handled as a non-posted write request and an ACK_PENDING packet will be transmitted, as illustrated in row 232. Later, a response packet is output after the write requests is executed and data is written to memory. When the physical response queue is full, as illustrated in row 236, an ACK_BUSY signal is output because the write request cannot be handled until a slot is available in the physical response queue.

Figure 3A:
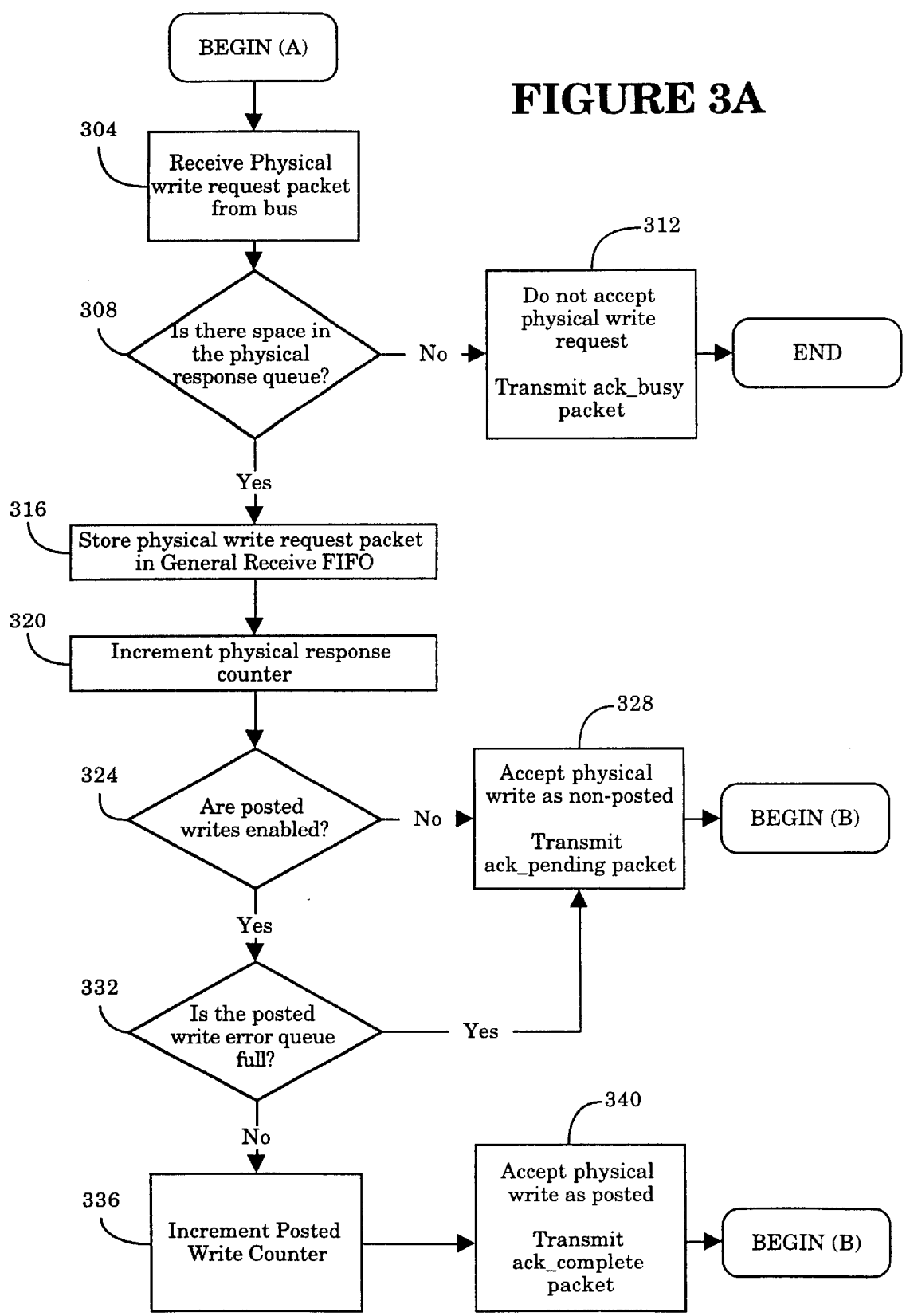
FIGS. 3A and 3B illustrate the operation of the circuit of FIG. 1.

FIG. 3A illustrates the operations executed by packet decoder 108 when in the embodiment of the invention shown in FIG. 1 handles a physical write request. In block 304, the physical packet handling circuit receives a physical packet containing a write requests. When in decision block 308, an indicator circuit indicates that the physical response queue does not have space, the physical packet handling circuit does not accept the physical write request and outputs a signal indicating that the circuit is busy by transmitting an ACK_BUSY packet in block 312. In the embodiment illustrated in FIG. 1, the indicator circuit is physical response counter 126. When the indicator circuit indicates that there is space in the physical response queue, the write request is stored in the general receive FIFO, in block 316. The accepted physical write request is recorded in the indicator circuit (e.g., a counter) in block 320.

In decision block 324, the physical packet handling circuit determines whether communicating devices are compatible and whether the protocol used between the two communicating devices handles posted writes. In one embodiment, whether posted writes are handled, is determined by the state of a posted write enable signal. When the enable signal indicates that posted writes are not handled, incoming write requests will be accepted as a non-posted write request. Thus, upon receipt of a write requests, an ACK_PENDING signal will be output in block 328 acknowledging receipt of the write request.

When posted writes are enabled in decision block 324, a posted write indicator circuit corresponding to the posted write error queue, determines in decision block 332 whether the posted write error queue can handle the posted write. In the embodiment shown in FIG. 1, the posted write indicator circuit corresponds to posted write counter 146. When the posted write indicator circuit indicates that the posted write error queue is full, the physical packet handling circuit handles the write request as a non-posted write request following the procedures outlined in block 328. When the posted write indicator circuit indicates that the posted write error queue has open spaces or slots, the incoming write request is stored in the posted write error queue in block 348, and the posted write queue indicator circuit is updated. In the embodiment illustrated in FIG. 1, the indicator circuits are updated by respectively incrementing posted write counter 146 as described in block 336. In block 340, the packet decoder accepts the physical write as a posted write and outputs an ACK_COMPLETE packet.

Figure 3B:
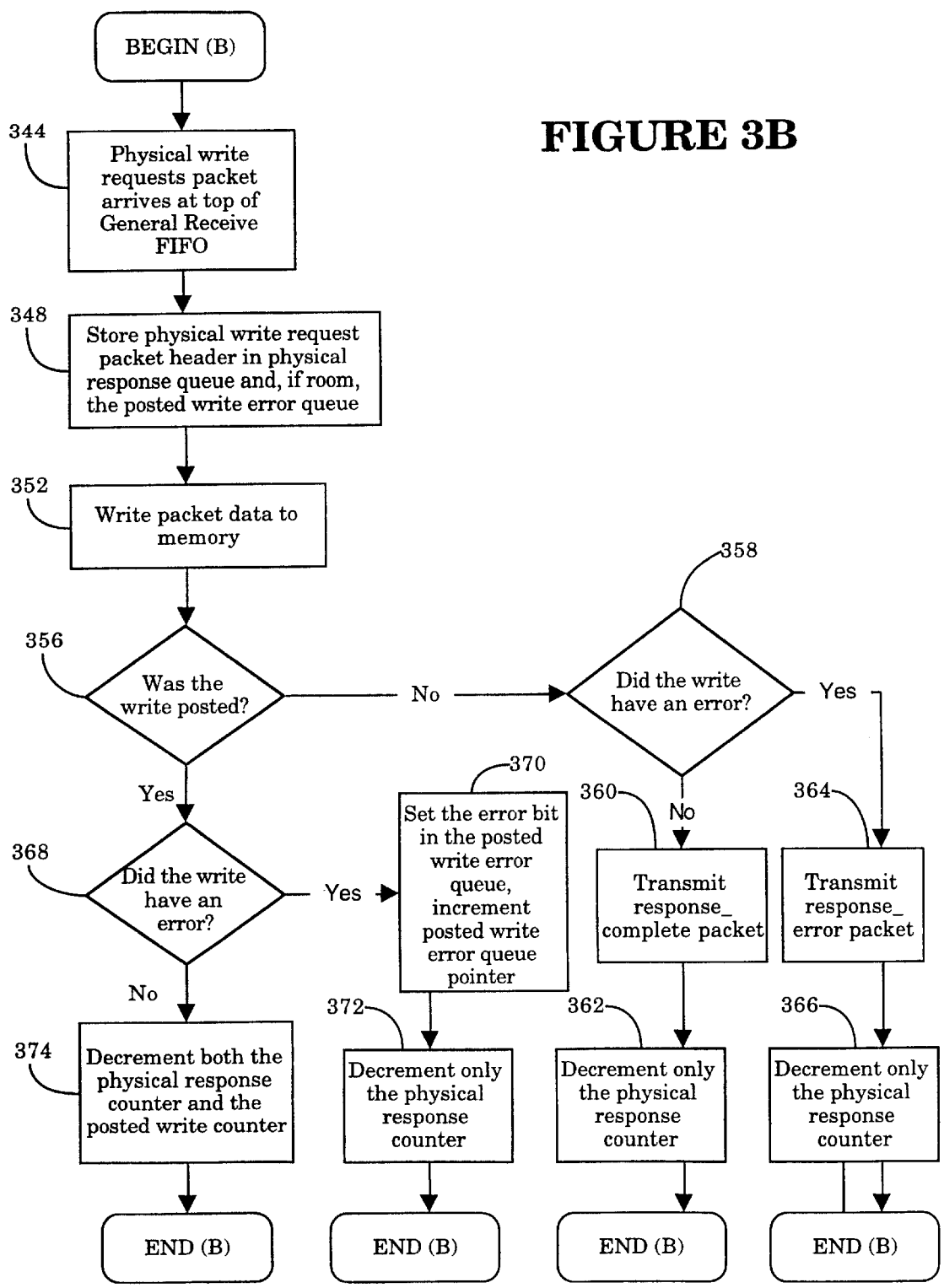

FIG. 3B illustrates the operation executed by the physical DMA when the packet decoder 108 of the invention shown in FIG. 1 accepts a physical write request. In block 344 the physical write request packet eventually arrives at the top of the general receive FIFO in block 344. In block 348 the header corresponding to the physical write request packet, or a physical write request packet header is stored in the physical response queue in block 348. If the posted write error queue is not full, the header is also stored in the posted write error queue. In block 352 the physical DMA attempts to execute the physical write request packet by writing packet data to a system memory.

In decision 356, the physical DMA determines whether the write request packet was handled as a posted or non-posted write. If in decision block 356, the write request packet was handled as a non-posted write request, the physical DMA then determines in block 358 whether the write request performed in block 352 resulted in an error. When the write request performed in block 352 does not result in an error and the write request was handled as a non-posted write request, the physical DMA outputs a RESPONSE_COMPLETE packet in block 360 and decrements the physical response counter in block 362.

When in decision block 358, it is determined that the non-posted write request resulted in an error, the physical DMA transmits a RESPONSE_ERROR packet in block 364. The RESPONSE_ERROR packet indicates that the attempt to write the non-posted write to memory was unsuccessful. In block 366, the physical DMA decrements the physical response counter.

When in decision block 356, it is determined that the physical request processed in block 352 was a posted write, the physical DMA determines in block 368 whether the posted write was successfully written to memory or whether the posted write resulted in an error. When in decision block 368, it is determined that the posted write resulted in an error, an error bit is set in the posted write error queue and a pointer indicating the location of the data which the physical DMA was unable to write to memory is incremented in block 370. The system also decrements the physical response counter in block 372.

When it is determined in decision block 368 that the posted write does not produce an error, and thus, the posted write was successfully written to memory in block 352, the physical DMA decrements both the physical response counter and the posted write counter in block 374.

Although this invention has been shown in relation to a particular embodiment, it should not be considered to be so limited. Rather, the invention is limited only by the scope of the appended claims.

What is claimed is:

1. A circuit for handling memory access requests, comprising:
   a general First-In, First-Out (FIFO) memory to store write requests from a bus;
   a first memory queue in communication with the general FIFO to receive write requests from the general FO for use by software in the event that an error results when executing the write request and the write request is handled as a posted write request, and
   a second memory queue coupled to the general FIFO to receive the write request from the general FIFO, the write requests in the second memory queue for use by a physical response DMA executing the write request.

2. The circuit of claim 1, wherein the physical response DMA decrements a posted write counter when the write request is handled as a posted write request and is performed without an error.

3. The circuit of claim 1, wherein the physical response DMA decrements a physical response counter when the write request is handled as a non-posted write request.

4. The circuit of claim 3, wherein the physical response counter is further decremented when an attempt to write a posted write to a destination memory is made, regardless of whether the attempt to write to the destination memory is successful.

5. A circuit for handling memory access requests, comprising:
   a memory device to store physical packets including data associated with write requests;
   a first queue to store data associated with a write request for processing when the write request being handled as a posted write request fails; and
   a second queue to receive data associated with a write request even when the first queue is fill.

6. The circuit of claim 5, wherein the first queue is a posted write error queue and the second queue is a physical response queue.

7. The circuit of claim 6 further comprising:
   a direct memory access (DMA) logic;
   a posted write counter in communication with the DMA logic;
   a physical response counter in communication with the DMA logic; and
   a packet decoder coupled to the posted write counter and the physical response counter, the packet decoder to deter if either the posted write queue or the physical response queue is full.

8. The circuit of claim 7, wherein the memory device routes the data associated with the write request to both the posted write queue and the physical response queue when the posted write queue is not empty.

9. The circuit of claim 8, wherein the data associated with the write request includes a source identification to identify a source of the write request.

10. The circuit of claim 8, wherein the DMA logic, in response to a post write error, clears data associated with a write request from the physical response queue before software has completed handling of the posted write error.

11. The circuit of claim 7, wherein the physical response queue, when not fill, continues to receive write requests as non-posted write requests when the posted write queue is full.

12. The circuit of claim 7, wherein the posted write counter is incremented when the data associated with the write request is received by the posted write queue and the posted write counter is not at a maximum value.

13. The circuit of claim 12, wherein the posted write counter is decremented when data associated with a write request placed in the posted write queue is successfully written to a destination memory.

14. The circuit of claim 12, wherein the physical response counter is incremented when data associated with the write request arrives.

15. The circuit of claim 14, wherein the physical response counter is decremented when an attempt to write data associated with the write request placed in the posted write queue to destination memory is made, regardless of whether the attempt to write to destination memory is successful.

16. The circuit of claim 7, wherein the packet decoder comprises:
   a first input to receive a posted write count being a number of write request data stored within said first queue;
   a second input to receive a physical count being a number of write request data stored in said second queue,
   a third input to receive a write request; and
   means for determining whether said first and second queues are full and routing data associated with the write request to both said first and second queues if not full and alternatively to said second queue if said first queue is full.

17. The circuit of claim 16, wherein said first and second queues are a posted write queue and a physical response queue, respectively.

18. The circuit of claim 17, wherein the posted write count is incremented when the data associated with the write request is received by the posted write queue and the posted write count is not at a maximum value.

19. The circuit of claim 17, wherein the posted write count is decremented when the data associated with the write request placed in the posted write queue is successfully written to a destination memory.

20. The circuit of claim 17, wherein the physical write count is decremented when an attempt to write data associated with a posted write request to destination memory is made, regardless of whether the attempt to write to the destination memory is successful.

* * * * *